United States Patent [19]

Schubert et al.

[11] Patent Number: 5,071,557
[45] Date of Patent: Dec. 10, 1991

[54] LIQUID/LIQUID HYDROCYCLONE

[75] Inventors: Mark F. Schubert; Reimer Z. Hansen, both of Houston, Tex.

[73] Assignee: Conoco Specialty Products Inc., Houston, Tex.

[21] Appl. No.: 575,030

[22] Filed: Aug. 30, 1990

[51] Int. Cl.$^5$ ............................................. B04C 5/081
[52] U.S. Cl. .............................. 210/512.2; 210/335; 210/512.1; 55/459.1; 209/144; 209/211
[58] Field of Search ................... 210/787, 333, 512.1, 210/512.2; 55/459.1; 209/211, 144

[56] References Cited

U.S. PATENT DOCUMENTS

| | | | |
|---|---|---|---|
| 4,237,006 | 12/1980 | Colman et al. | 210/512.1 |
| 4,464,264 | 8/1984 | Carroll | 210/512.1 |
| 4,544,486 | 10/1985 | Carroll | 210/512.1 |
| 4,710,299 | 12/1987 | Prendergast | 210/512.1 |
| 4,719,014 | 1/1988 | Carroll | 210/512.1 |
| 4,721,565 | 1/1988 | Carroll | 210/512.1 |
| 4,749,490 | 6/1988 | Smyth et al. | 210/512.1 |

Primary Examiner—Robert A. Dawson
Assistant Examiner—David Reifsnyder
Attorney, Agent, or Firm—John E. Holder

[57] ABSTRACT

A high efficiency hydrocyclone for separating liquid constituents of a mixture wherein one constituent is a dispersed phase in another continuous phase constituent. The separation chamber of the hydrocyclone is configured such that a first steep tapered or curved portion progresses to a second less steeply tapered or curved portion with the beginning of such second less tapered portion being arranged close to the inlet end. A third substantially cylindrical portion extends from the second portion to an underflow outlet and is of an extended length to provide for continued separation of the mixture and particularly to separate smaller droplet sizes of the dispersed phase.

22 Claims, 6 Drawing Sheets

LIQUID/LIQUID HYDROCYCLONE

FIELD OF THE INVENTION

The present invention relates generally to the separation of liquid/liquid mixtures, and more particularly, but not by way of limitation to the separation of oil from oily water or water from oil where these liquids are being processed such as an oil well production site or any processing plant where oil and water are handled as a mixture.

DESCRIPTION OF THE PRIOR ART

In a typical oil well production operation the amount of produced water increases as a field matures. In some, if not most operations, the bulk of the volume of produced fluids may be water. Consequently, there is in such operations, a large amount of water to be disposed of or otherwise handled in some manner. This typically is an expensive process, i.e. dealing with disposal of produced water. Although there may be no direct economic incentive, recent tightening of government regulations in various parts of the world regarding the amount of oil in discharged waters has increased interest in improving and optimizing oily water separators. This problem is particularly acute on offshore production platforms. Size and weight limitations on separation equipment limit the available options. Furthermore, on floating offshore platforms, the movement of the platform may effect the performance of some traditional types of separating equipment. Not the least important is the problem of separating oil from water to the extent that the water can be disposed of in the sea or body of water within environmental standards.

In order to solve some of the problems associated with the circumstances described above, hydrocyclone separators have been employed to solve these oil water separation problems. Traditionally, however, the use of hydroclones has been for the separation of mixtures such as liquids/solids and gas/solids and therefore the problems associated with liquid/liquid separation were not addressed. In particular, the separation of oil and water further complicates the issues in that the separation associates with high shear fields which provide an additional problematic aspect to liquid/liquid separation. The nature of an oil/water mixture is that of a liquid dispersion which is a complex dispersion, and the application of a hydrocyclone to the separation of two immiscible liquids was at one time thought to be impossible. A liquid dispersion within a continuous liquid phase poses separation problems to a person skilled in the art, such as the low differential density between the liquid phases and the sensitivity of the liquid dispersion to sheer forces. Generally, the differential density (specific gravity) is of the order of less than 0.2 and presents a problem when separating the dispersion from a continuous phase. Most hydroclones in present day use are designed for removing a more dense dispersion from a continuous phase and do this by creating a vortex within the hydrocyclone body which causes the more dense dispersion to migrate radially outwards towards the walls leaving a dispersion depleted continuous phase near the axis of the hydrocyclone. To the contrary, nearly all oils are less dense than water and therefore when oil contaminated water is passed through a hydrocyclone the radial acceleration of the vortex causes the oil droplets (disperse phase) to migrate towards the hydrocyclone axis at the center of the vortex, leaving oil free water (continuous phase) near the walls of the hydrocyclone. This, therefore, puts different constraints upon the design of the hydrocyclone. Whereas, with a more dense dispersion the majority of the continuous phase is removed through the vortex finder in the upstream end wall of the hydrocyclone, as the overflow. The separated dispersion leaves the cyclone, with a small part of the continuous phase from the wall boundary layer, in the underflow. When the dispersion is the less dense phase, the underflow becomes the greater proportion of the total throughput (90 to 95%) while the overflow (removing the dispersion from the hydrocyclone axis), is much reduced. Also, the more dense dispersion upon reaching the hydrocyclone wall is held there in the relatively stable wall boundary layer but the less dense dispersion that forms a core along the hydrocyclone axis has no such constraint and relies entirely upon the favorable internal flow structure for its stability and removal from the hydrocyclone without further disruption. Since the density difference is relatively small with an oil dispersion in water, and the hydrocyclone design must produce regions of very fast spin to promote separation; but at the same time, also avoid breakup of the oil drops in regions of high shear. With these constraints in mind, the design of an efficient hydrocyclone for oily water separation although perhaps superficially similar to the case of a hydrocyclone for the more dense dispersion, is essentially different in its requirement, leading to a rather different geometry.

Important early work in the development of the liquid/liquid hydrocyclone occurred in the late 70's and early 80's by Martin Thew and Derek Coleman at Southampton University and at this stage test work indicated that the minimum nominal size of a hydrocyclone would be about 28 mm. It was thought that any further reductions of the nominal size of a liquid/liquid hydrocyclone would generate high internal sheer stresses which would further break up the sensitive oil in water dispersions and therefore, would work contrary to the desired separation of the phases. This nominal size of the hydrocyclone is referred to as the reference diameter of the cyclone, i.e.. the point substantially at which the tangential component of velocity is maximum. Thus, in view of this early work and problems in the petroleum industry needing a solution, liquid/liquid hydrocyclones were used commercially for the purpose of separating two immiscible liquids, with the majority of these applications being for removing relatively small percentages of oil from water within the oil industry. In view of this early work by Thew and Coleman, the nominal sizes of liquid/liquid hydrocyclones dealing with oil/water dispersions, that have been marketed up to the present, have been 35 mm, 38 mm, 58 mm, and 60 mm.

The reference to the nominal size gives an indication of the capacity of the unit for a given driving pressure. Generally, from a manufacturing point of view the larger the nominal diameter of the cyclone the less separation units or tubes that will be required for a given system capacity. The above sizes were selected by various designers based on the aforementioned research, with a view to obtaining optimal separation efficiency and capacity throughput. Generally, as mentioned above, the minimal diameter was thought to be 28 mm and no liquid/liquid hydrocyclone with a nominal diameter less than 30 mm were marketed for this reason. Some of the practical problems associated with operating the liquid/liquid hydrocyclones were that the separation efficiency achieved with the nominal diameter cyclones ranging from 35 mm to 60 mm would not be sufficient to meet certain process specifications. Some processes have relatively small volumes of liquid that require a liquid dispersion to be separated and may be typically less than for example, 100 barrels a day in an oil field operation. The minimum volumetric flow rate, under which a single 35 mm hydrocyclone can perform adequate separation, is typically greater than 400 barrels per day. The 60 mm nominal size cyclone requires at least a thousand barrels a day.

Another problem relates to the minimum driving pressure. For a hydrocyclone having a nominal diameter of 35 mm, the minimum driving pressure is about 60 psi, and for a 60 mm hydrocyclone, it is about 100 psi. There are other factors that may effect the minimum driving pressure, such as the viscosity of the continuous phase.

To further digress into the background of this invention, prior to the work set about by Thew and Coleman in the late 1970's, the standard design of a hydrocyclone was for solid/liquid or solid/gas applications and included a short cylindrical inlet section followed by a relatively steep tapered cone. The overall length/diameter ratio of the separation chamber, typically, was about ten. Work was done in the mid-1960's by both Regehr and Bohnet on liquid/solid technology who, eventually along with Thew, Coleman, and Listewnik began to work with liquid/liquid problems. Because of shear sensitivity in oil/water separation problems, it was initially concluded that it was necessary to impart centrifugal force under much gentler conditions and therefore, the only way to generate proper separation was to increase the length/diameter ratio. These early researchers took as their starting point a cylindrical cyclone having a length/diameter ratio between 10 and 25. The result was a simple cylindrical chamber with Regehr adding a small cone to the outlet side. Their early work found that going beyond a 25 length/diameter ratio was anti-productive in that the frictional loss in longer chambers would be significant enough that the tangential component of motion would be severely reduced and therefore, there would be a loss in flow to the extent that the flow through the hydrocyclone would go to a laminar flow regime. Therefore, it developed that the length/diameter ratio of 10 to 25 was the optimum. Then, Thew, in the late 70's, started working with a design which had multiple, decreasing diameter steps in it. The concept was that (1) it was desirable to increase the length of the separation unit in order to increase the residence time and also to gradually increase or at least maintain the velocities throughout the hydrocyclone period. This was done by decreasing diameters. The original work was simply a design which maintained angular momentum over the frictional loss as in the cyclone. These designs eventually evolved to a hydrocyclone having a length/diameter ratio of 10 to 25 and a nominal diameter $d_2$ which was 0.5 $d_1$, with $d_1$ being the diameter of the inlet portion. There was then provided a taper from $D_1$, of approximately 10° half-angle, up to the portion $d_2$, which was considered the nominal diameter of the hydrocyclone, at which point the tangential velocity was near a maximum. Eventually, the overall length/diameter ratio approached 25, in that Thew's work showed that better separation was attained by maintaining the tangential velocity component over a greater period of time. Work done by Thew and Coleman in 1981 demonstrated that the efficiency of separation would increase with the use of smaller diameter hydrocyclones, however, because of problems associated with high shearing in oil/water dispersions, their work noted as previously mentioned that a minimum nominal diameter limitation of 28 mm prevailed, that smaller diameters would increase oil drop breakup, and that hydrocyclones below this 28 mm size were too small for good efficiency.

Hydrocyclones began to find commercial acceptance in the oil/water market because of the increased attention to environmental pollution. In order to return produced water to the ocean in offshore operations, it became mandatory to reduce the residual oil in water to typically less than 40 ppm. Many separation situations have been able to utilize the heretofore described hydrocyclones to accomplish this task. Such hydrocyclones are described in U.S. Pat. Nos. 4,237,006 and 4,251,368 to Coleman and Thew. It is interesting to note that these and other patents suggest that the nominal diameter of a hydrocyclone can range from 5 to 100 mm, although later research data by these same inventors indicated that hydrocyclones below 28 mm would be inefficient. It appears that these earlier suggestions of nominal diameters ranging up from 5 mm were merely speculative and had no real basis other than an attempt to broaden the disclosure to cover all the possibilities, in that no known attempts were made to build and test, at least on a commercial basis, such smaller models. In any event the work by Thew and Coleman indicating that diameters less the 28 mm would be inefficient was sufficient to discourage any further reduction of sizes below about 30 mm. Lengths were disclosed as being under 25 times the nominal diameter. The same three portion geometry disclosed in these patents and other equivalent configurations including curved housings, have dominated the commercial oil/water separation market for separators in the petroleum industry. U.S. Pat. Nos. 4,544,486; 4,464,264; 4,719,014 and subsequent patents to Noel Carroll further described refinements to the basic or standard "deoiling" hydrocyclones. Later patents such as U.S. Pat. Nos. 4,721,565 to Carroll and 4,749,490 to Smyth and Thew applied variations on those geometries to apply this technology to the separation of oil and water, where oil represents a greater percentage and may be even the major portion of a mixture. These are sometimes termed "dewatering" hydrocyclones. In some of these mixtures, water may be the disperse phase in an oil continuous phase.

As industry acceptance of this product has grown, so has the need for making the device more efficient in separation of the phases. In deoiling operations, the need is being seen to reduce the percentage of oil in oily water being separated for discharge back into the ocean. Also, separation applications which will not respond to these above mentioned systems now bear looking at if more effective and efficient hydrocyclone separators are produced.

Therefore, in order to meet the ever increasing more stringent requirements of the environmental regulations, and separation problems unsolvable by present commercial products, it is becoming increasingly important to develop separation techniques of the type which will provide more efficient separation in order to meet the criteria which, for example, in the petroleum industry is now tending to fall below the heretofore typical standard of 40 ppm of oil in water which is to be returned to the ocean in an offshore drilling operation. As a result, testing has recently been established to determine whether the heretofore size barriers which were considered as limiting, would provide a solution to the overall problem of increasing the efficiency of hydrocyclones in oil/water separation. This recent work has led to new developments in hydrocyclone design which appear to have broken some restrictive performance barriers in prior commercial designs. One such development is a hydrocyclone utilizing a very rapid acceleration design together with a minimal length inlet chamber and progressively reducing in size through a rapid transition down to the nominal diameter size of the hydrocyclone. This concept is based on the theory that you stabilize an inlet flow in a very small chamber by maintaining an optimal condition where the inlet velocity at the inlet diameter $d_i$ does not exceed the sheer stresses of the droplets so that you get a good transition acceleration of the flow entering the hydrocyclone without shearing it at this point. Once you reach this optimal stabilized condition, you can then very rapidly decrease the diameter of the separation chamber which in turn increases the acceleration field. This work tends to show that the sooner you narrow to a nominal diameter $d_2$, the higher the efficiency of the unit. In following this theory you transition from diameter $d_i$ to diameter $d_2$ rapidly and then use a very gradual taper from $d_2$ to the outlet diameter. On the other hand, with such a rapid transition you create significantly higher pressure losses in the cyclone and the increase in pressure loss because of the higher acceleration field gives a lower flow capacity through the cyclone which provides a concern from the capacity standpoint. In order to meet flow requirements it is then necessary to increase the number of cyclones in a system.

In the design of liquid/liquid hydrocyclones it has been considered important to provide very smooth transitional flows along the length of a hydrocyclone in an attempt to maintain a given centrifugal force for a given length of the cyclone with a minimum of frictional losses and flow disruptions. In an attempt to improve separation efficiency, it was decided to experiment with a simple extension to the separation chamber length to allow additional residence times so that smaller droplets which are less buoyant can effectively have more time to reach the central core to be removed. Prior attempts have typically been around a method to have a smooth transition from the inlet flow to a maximum acceleration, maintaining that acceleration for a certain length, and then adding residence time as needed. The trade-offs here are that the additional residence time creates considerable additional pressure drop which in the past was felt would be unwarranted due to marginal increases in efficiency that would be gained. Another aspect to having rapid transitions between accelerations in the cyclone was that by increasing the fluid velocity or angular momentum rapidly there would be sheer stresses created in the fluid flow and therefore the droplets of the dispersed phase would be harder to remove. It is noted that in the inlet design you typically attempt to increase the velocity entering the cyclone only to a point where shear stresses becomes excessive and droplet breakup becomes significant. Significant breakup means that droplets are sheared to a point that they can not be effectively removed in the cyclone. Therefore, in order to solve the problems at hand there are basically two issues. One concerning the effect of droplet shearing due to acceleration which is a major concern and a second issue having to do with the effect of increasing the pressure loss in the hydrocyclone. Pressure loss is detrimental with respect to available pressures to operate the cyclone, which may have to be increased and therefore the energy input would have to be increased.

Another problem which was faced by designers of water/oil hydrocyclones was that of "reintrainment". When oil migrates to the core it can become reintrained into the water in a boundary layer that exists near the core. This is thought to be especially true if the velocity of swirl is low. However, by increasing the velocity you also incur the risk of increasing shear. Thus, while smaller diameters and steeper tapers might increase the velocity of swirl, they would also increase the prospect of shear of larger droplets.

Yet another phenomenon which occurs with steep taper is that of recirculation. Eddy currents in the inlet section tend to build up when you reduce a large volume to a small volume in a short distance. The constriction provides a flow vector toward the inlet which promotes an axially oriented swirl. This phenomenon was seen by Thew and others and steered design to gentler tapers. Recirculation in the involute gives a buildup of solids in the inlet end section near the outer wall where it meets the inlet end which in turn causes erosion in the chamber.

Thus, notwithstanding, the apparent adverse phenomena attributed to decreasing the diameter of a hydrocyclone as set forth above, applicants nevertheless made an attempt to overcome the obvious problems in order to develop a higher efficiency hydrocyclone. This decision was partly motivated by the realization that past work had been done with large droplet sizes and now the applicants were again looking at droplet size distribution and more carefully noting that distributions nearly always contained a segment of smaller droplet sizes which would ultimately have to be dealt with. While it was understood that a smaller hydrocyclone would develop high acceleration fields and higher velocity gradients thus tending to increase the turbulence level as related to particle integrity, a more careful look at the dynamics of a hydrocyclone separation chamber show that the smaller droplets, for example, in the 5 to 10 micron range tend to be more robust and less effected by shear. Again, in solid particle hydrocyclones you can go to a smaller diameter separation chamber without detriment due to shear considerations in that with particles you want a higher acceleration field, and shear can aid in separation by knocking out particles. It occurred to the present inventors that a window would occur for separating out small droplets in the liquid/liquid field if, in fact, you manage the small droplets in such a way as to not encourage the further shearing of the droplets, at least beyond a level that can be dealt with in the hydrocyclone. It was decided to work in this direction with the ultimate hope that a hydrocyclone of a smaller diameter could be developed which would increase the efficiency of liquid/liquid separators and in particular an oil/water separator involving dispersions having small droplet sizes in the disperse phase.

It is therefore an object of the present invention to provide a new and improved hydrocyclone for separating liquid constituents of a mixture and in particular oil and water phases of a liquid mixture wherein the nominal diameter of the hydrocyclone, or throat diameter as it is referred to herein, is in the range of 8 to 28 mm. The improved hydrocyclone would be capable of operating at low driving pressures and still maintain satisfactory separation efficiency, notwithstanding the small diameter, where the minimum volumetric capacity can be as low as about 50 barrels a day for a single cyclone unit. Such an improved separator will be effective to process small droplet sizes and will have greater efficiencies than that of larger nominal diameter cyclones at similar process conditions. The area to volume ratios utilized in the elongated portion of the separation chamber in such a hydrocyclone will be in a range of values which promotes an unusually high efficiency.

SUMMARY OF THE INVENTION

With these and other objects in view the present invention contemplates a hydrocyclone for separating liquid phases of a mixture wherein one of the constituents is a disperse phase of liquid droplets within a liquid continuous phase such as occurs in an oil in water or water in oil dispersion. The hydrocyclone comprises a separation chamber having one or more inlet openings for inletting the fluid mixture into an inlet portion at one end of the separation chamber. An overflow outlet, which may be axially disposed in the end wall of the inlet portion, provides an outlet for a less dense phase of the mixture. An underflow outlet for outletting a more dense phase is disposed at the other end of the separation chamber opposite the inlet end. The separation chamber is further characterized by a first relatively steep tapered or curved portion for rapidly accelerating the fluid within the acceleration chamber, yet without further shearing the disperse phase droplets beyond that level than can be handled by the hydrocyclone. The relatively steep tapered first portion is followed by a less steeply tapered or curved second portion, which represents an elongated portion of the separation chamber. The transition between the first and second tapered portions is represented by a throat portion having a diameter $D_T < 28$ mm which is also referred to as the nominal diameter of the hydrocyclone. The separation chamber can alternatively even be cylindrical or partially cylindrical if it meets the functional needs of the invention. The elongated portion of the separation chamber extending past $D_T$ includes any tapered, curved, cylindrical or substantially cylindrical portion which makes up the total length $L_e$ of the elongated chamber up to the underflow outlet. This elongated portion $L_e$ of the separation chamber is shown to operate most efficiently for such liquid/liquid mixtures when arranged to have an area to volume ratio $(A/V)_{Le}$ falling within certain parameters. This efficiency and the overall performance of the hydrocyclone is further enhanced by locating the $D_T$ within a certain limited distance from the inlet. The mean droplet size that is removed by such a hydrocyclone is reduced in proportion to increases in efficiency.

DESCRIPTION OF THE PREFERRED EMBODIMENTS

Figure 1A:
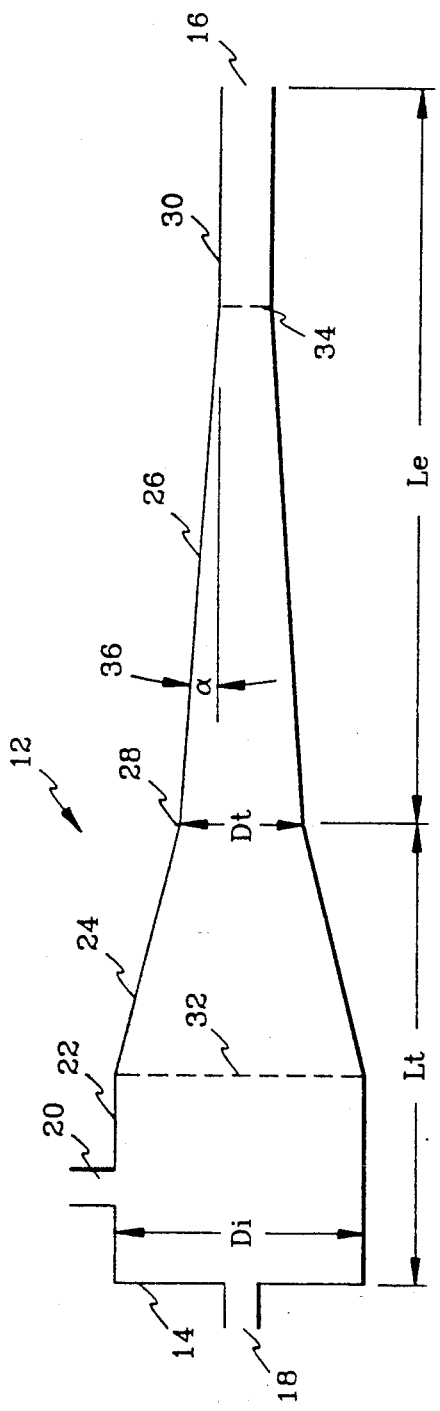
FIG. 1 is a schematic view of two alternative geometrical shapes for separation chambers in a hydrocyclone.

Referring first to FIG. 1 (a and b) of the drawings, a hydrocyclone 12 is shown in two slightly different configurations, first having an elongated separation chamber beginning at a larger end 14 and continuing in a housing formed by a volume of revolution to an opposite smaller end forming an underflow outlet 16. An overflow outlet 18 is shown positioned in the wall of the larger end 14. An inlet 20 at or near the larger end 14 provides an inlet means for fluid mixtures into the separation chamber. An inlet diameter $D_i$ represents the average diameter at which flow enters the cyclone through the one or more inlets and is thus twice the minimum distance of the tangential component of the inlet centerline from the cyclone axis. The inlet plane is defined as the plane perpendicular to the axis of the cyclone at the mean axial position of the inlets such that the injection of angular momentum of fluids into the hydrocyclone is equally distributed about it.

It is to be noted that the profile of the volume of revolution forming the separation chamber may take an infinite variety of forms with only two such configurations being set out in FIG. 1 (a and b). FIG. 1a is comprised of discrete portions including an inlet portion 22 represented by a cylindrical chamber followed from left to right by a first steeply tapered conical portion 24 which is then followed by a second less steeply tapered conical portion 26. The transition between the first and second tapered portions is represented by a throat portion 28 which is also styled as $D_T$ for reference purposes. This D throat is also referred to as the theoretical nominal diameter of the hydrocyclone and represents an important reference for teaching the concepts embodied herein which provide high efficiency characteristics. It is to be remembered that this $D_T$ is merely a theoretical reference and while it is purported to be the place where approximate maximum tangential velocity or swirl occurs, it may be in reality that such a point would be difficult to pinpoint precisely. Therefore, it is the purpose herein to use the concept to transmit the teaching embodied herein and to provide sufficient certainty to claim the invention; however, it should not be taken as an absolute. The final portion of the separation chamber in FIG. 1a is shown as a cylindrical or substantially cylindrical parallel section 30.

Figure 1B:
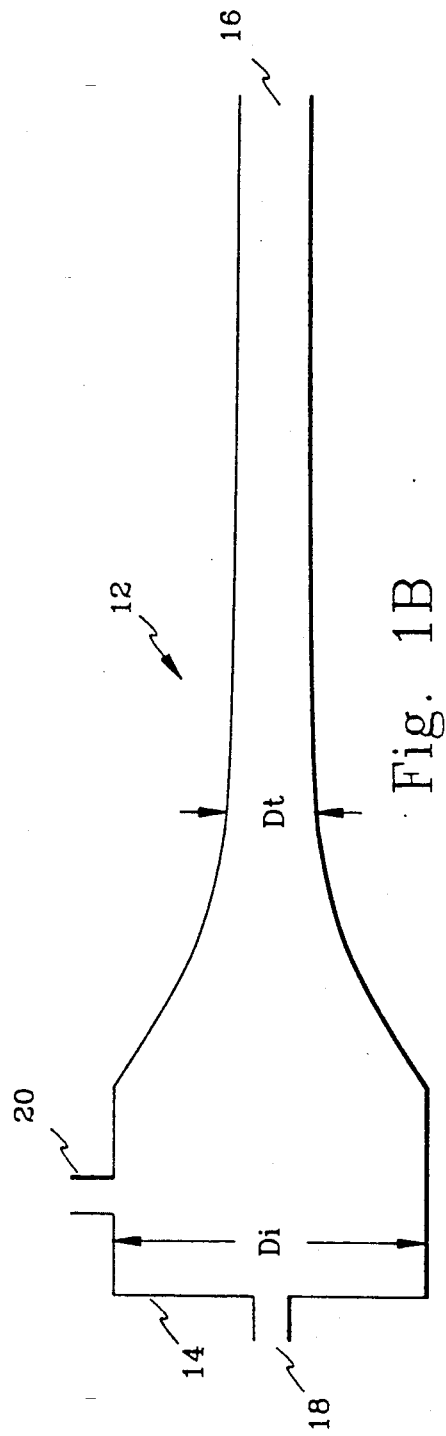

In FIG. 1b the separation chamber shown does not display discrete portions but nevertheless such portions are embodied at least functionally in FIG. 1b. For example, where the inlet 20 enters the separation chamber, there is functionally an inlet portion corresponding to the inlet portion 22 in FIG. 1a, etc. with the other corresponding portions being represented throughout the length of the entire separation chamber as it progresses in a continuous curve to the underflow outlet 16. The throat diameter $D_T$ which is also referred to as the nominal diameter is defined in several different ways as will be hereinafter described, but functionally, the throat is that approximate place where the fluids flowing through the separation chamber have substantially reached their maximum acceleration and tangential velocity. As previously stated this is not an absolute. In the standard geometry that has developed in the liquid/liquid hydrocyclone art, $d_2$ is usually the designated reference for this nominal diameter, herein designated $D_T$. $d_2$ is sometimes defined as occurring where the diameter of the body is, 0.5 d. In the case of a single involute inlet $D_i$ is generally greater than $D_1$ but in the case of a straight turn tangential inlet $D_i$ can be less than $D_1$. In this application $D_i$ represents a functional place where the mixture enters the hydrocyclone and is therefore descriptive of what is happening dynamically. Therefore, in this application $D_T$ is described with reference to $D_i$, usually as occurring at $>0.5$ $D_i$ or equal to 0.6 $D_i$.

Figure 2:
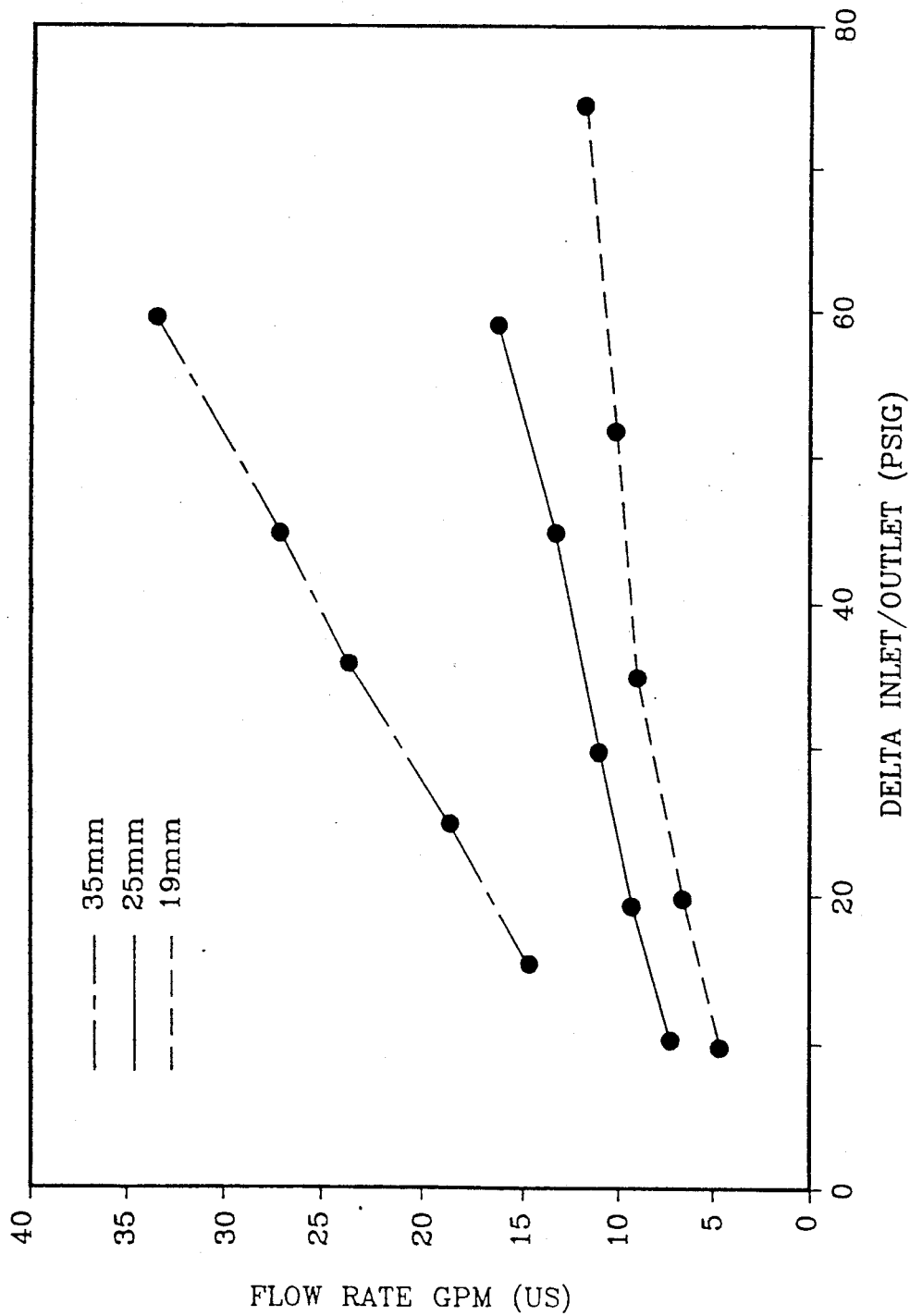
FIG. 2 is a graphical representation of flow rates versus delta pressure between inlet and outlet of various nominal sizes of hydrocyclones.
Figure 3:
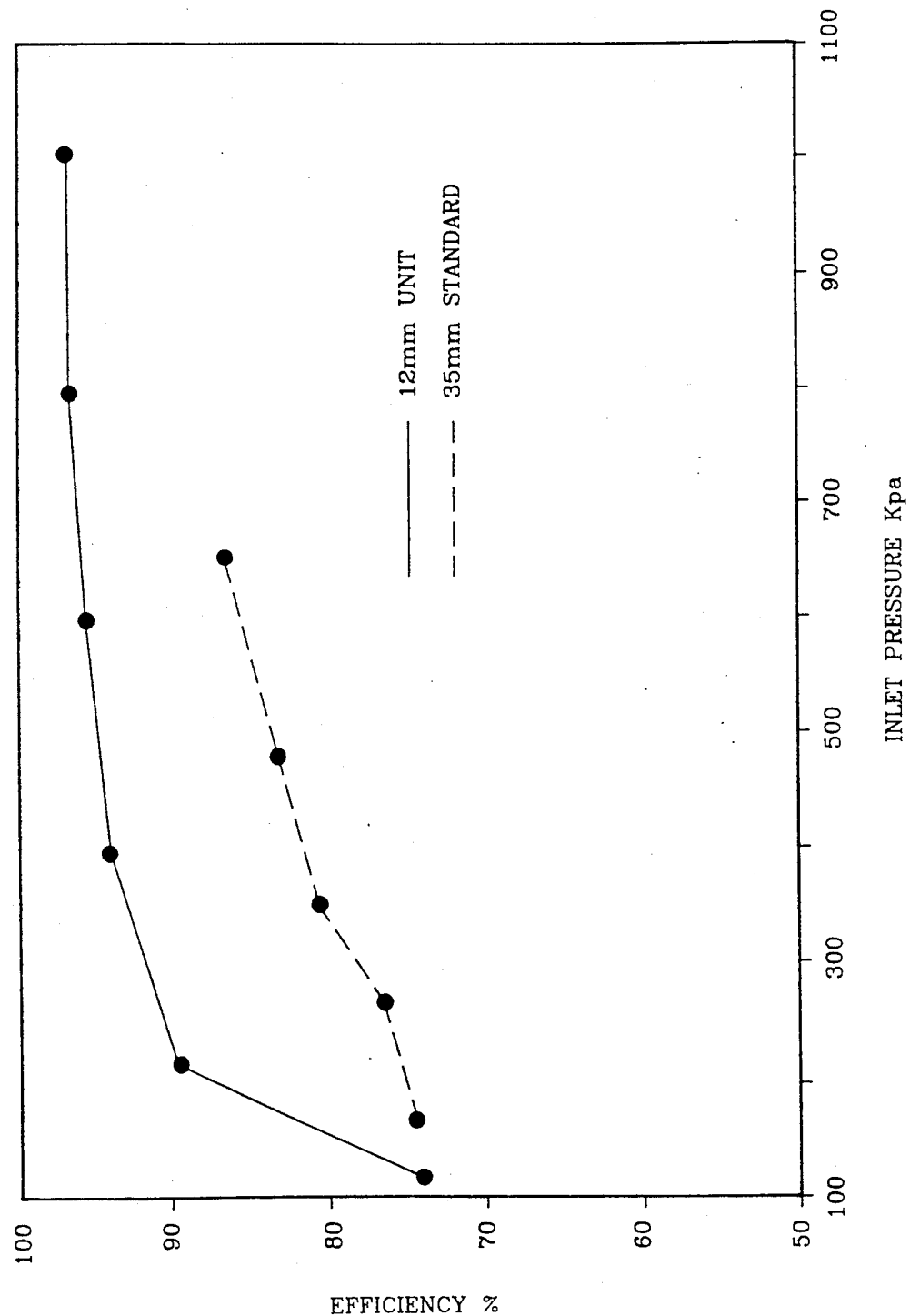
FIG. 3 is a graphical representation of inlet pressure versus efficiency for a standard and small nominal diameter hydrocyclone.

As was discussed in the Background of The Invention, it is a change in conceptual thinking that now leads to the implementation of a smaller throat diameter which is an important aspect of the present invention. A great deal of experimental work has recently been done to identify those parameters including optimal nominal diameters which provide an increase in separation efficiency. It has been found that efficiency generally increases as the diameter decreases. As diameter decreases, there is also an accompanying increase in pressure drop across the unit assuming constant throughput, or a decrease in throughput assuming a constant inlet pressure. FIG. 2 shows graphically what occurs to flowrate versus pressure when using three different sized hydrocyclones built with a geometry configured similar to FIG. 1a. By picking any point of constant pressure differential between inlet and outlet pressure, say 50 psi for example, it is seen that for a nominal diameter 19 mm hydrocyclone the flowrate is approximately 10 gallons per minute while at the same delta P, the flowrate is approximately 29 gpm for a 35 mm hydrocyclone. This, of course, illustrates the disadvantage of small flowrates with a smaller diameter unit, if large flowrates need to be dealt with, which would necessitate a plurification of individual separation chambers. On the other hand, it is seen in FIG. 3 that for a given inlet pressure a 12 mm hydrocyclone demonstrates a substantial improvement in efficiency over a 35 mm unit. The tests which were used to gather this data had parallel flow lines arranged so that produced fluid from a well was divided through two flow lines simultaneously to be separated in the two different separation chambers, i.e., 35 mm and 12 mm sizes. This provided identical conditions for all the liquid properties including droplet size distribution, density, temperature, etc.

While it is obvious that utilizing a smaller diameter will increase pressure at a given flowrate within a hydrocyclone, it is also expected that the increase in pressure will increase the likelihood of shear stresses being imposed upon the droplets making up the disperse phase. In considering design parameters of hydrocyclone, we have in the past focused on Stokes law which in part says that separation is a function of droplet size and that small droplets are significantly harder to separate than large droplets. Thus, hydrocyclones will not efficiently remove smaller droplets within a certain range. It was also thought that smaller diameter cyclones and steeper taper angles in the separation chamber were likely to shear droplets within the cyclone, thus generating smaller droplets which would be difficult to remove. Therefore, designers failed to take advantage of the fact that smaller diameter cyclones effectively remove smaller droplet sizes. This is because the effect of shearing in the cyclone is less detrimental when you are dealing with smaller droplets which are already sheared, so to speak. Therefore, shearing in the cyclone caused by design parameters will tend to mostly affect the larger droplets. i.e.. it is the larger droplets that will be sheared in the cyclone. However, as long as we don't shear below say 6 microns, which the smaller diameter units will accommodate, then we need not be concerned with the fact that both smaller throat diameters and more rapid transition to smaller D throat will likely cause shearing of larger drops, since these sheared drops will now be more effectively removed. This also mitigates against the teachings of shearing problems with respect to reintrainment and recirculation. In view of the above, it is now recognized that the hydrocyclone may be configured to quickly accelerate the mixture to take out the larger droplets and again quickly accelerate the remaining mixture without further shearing what is left, or not shearing what remains below say 6 to 8 microns. With the smaller diameter, the hydrocyclone has a smaller volume and the remaining droplets will have a better chance to contact one another, thereby coalescing, and thus be more likely to separate due to the centrifugal separation process of the hydrocyclone. By having a smaller diameter, you also physically reduce the distance that a droplet must migrate to reach the central core and thereby also reduce the time that it takes to reach the core. These characteristics lead to an increase in the range of droplets that are removed from the mixture and thus increase the efficiency of separation. If we then add a longer residence time for maintaining this dynamic, the chance for coalescence and thus separation is further enhanced.

Figure 6:
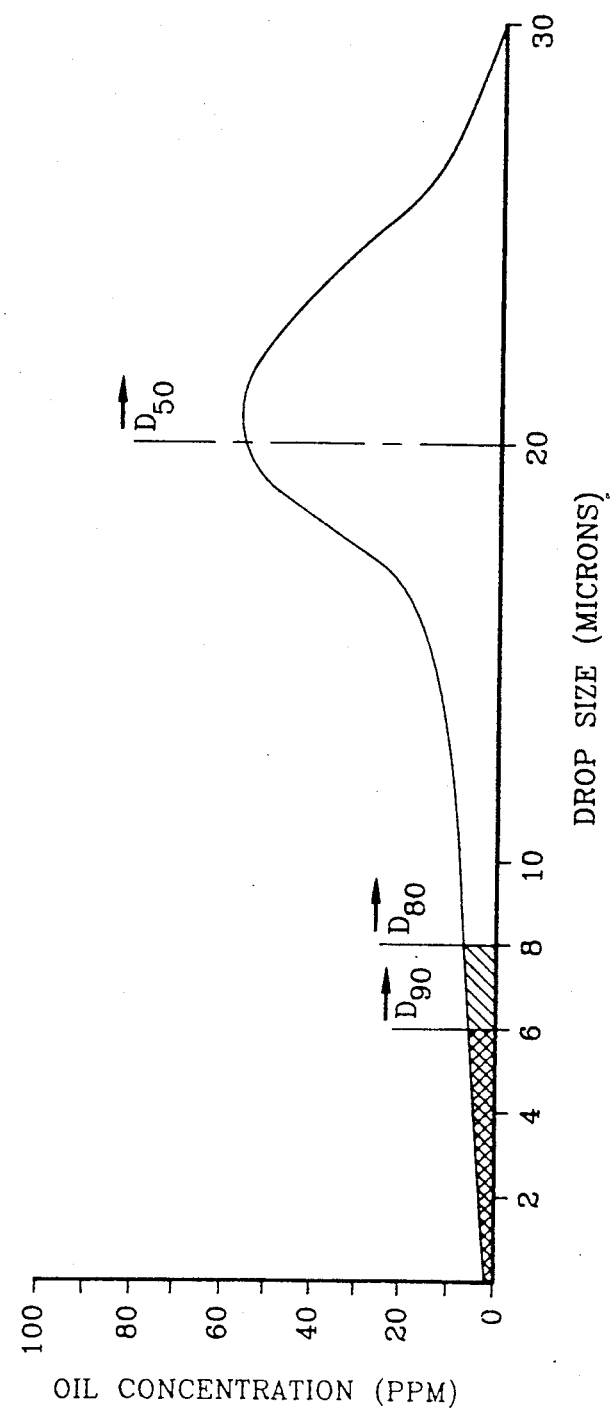
FIG. 6 is a graph showing a normalized curve representing drop size distribution of a dispersed phase of an oil-water mixture.

While it is recognized that the smaller diameter and/or more steeply tapered hydrocyclone will most likely generate additional shear of the larger droplets, this disadvantage appears to be outweighed by the fact that the smaller diameter hydrocyclone also will separate out a smaller droplet size and thus the mean droplet size removed decreases with the nominal size of the hydrocyclone. Therefore, the volume of droplets removed is increased in smaller nominal sizes and efficiency is thereby increased. Data suggests that the hydrocyclones having a nominal diameter of 8 to 28 will effectively remove droplets in the 4 to 10 micron range. Thus, while shearing of droplets may take place as a result of the smaller size and steeper tapers, this effect is offset by the increased portion of the mixture that is removed. For a given set of conditions, the underflow outlet will have disperse phase components present in the form of droplets which have not separated out in the separation chamber. With the smaller nominal size diameter body the droplet size distribution of these remaining droplets at the underflow outlet will have a mean size which is less than the range of 4.8 micron whereas a larger than 28 mm hydrocyclone under the same conditions will have an outlet distribution that is higher. That portion of the mixture which is represented by this differential in mean droplet size will be determinative of the improvement in separation efficiency. This relationship is shown graphically in FIG. 6 wherein the normalized inlet droplet distribution of a mixture is represented by the area under the curve in that figure. For purposes of illustration the mixture has a disperse phase of 1000 ppm of oil in a continuous phase of water, which 1000 ppm of the disperse phase is represented by the area under the curve. The mean droplet size $D_{50}$ of the disperse phase in this illustrative example is 20μ. If a 35 mm nominal diameter hydrocyclone removes these droplets under a given set of conditions (temperature, ph, etc.) above those having a mean size of 8μ and that portion of the disperse phase above 8μ represents 80% of the distribution, $D_{80}$, then the hydrocyclone efficiency is 80% and the droplet concentration at the underflow outlet will be $0.2 \times 1000$ ppm or 200 ppm. A 20 mm nominal diameter hydrocyclone might, however, remove droplets down to approximately 4μ under these same conditions, lets say down to a mean size of 6μ, which represents 90% of the distribution, $D_{90}$. Therefore, the performance of this latter hydrocyclone will be 90% and $1000 \text{ ppm} \times 0.1 = 100$ ppm, thus providing an increase in efficiency of 10%. Early data indicates that under normal field operating conditions, the illustrative example above is representative of the improvement that can be expected with the smaller nominal diameter units. This, of course, presupposes that the mixture contains a substantial portion of smaller droplets whereby this advantage will operate.

Figure 4:
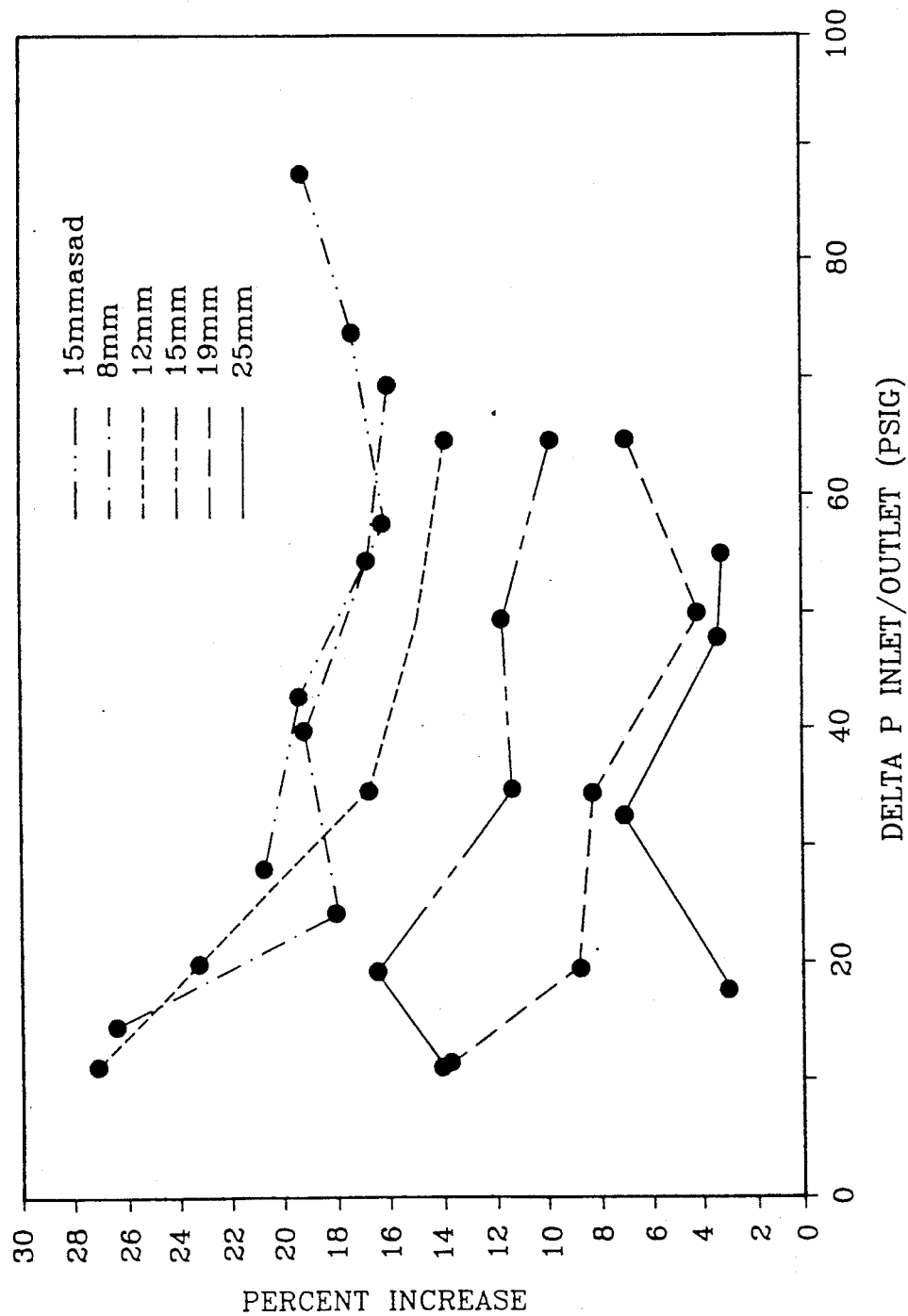
FIG. 4 is a graphical representation of inlet/outlet pressure differential versus increase in efficiency for various nominal sizes of hydrocyclones.

FIG. 4 provides a comparison for various sized separation chamber bodies, for percent increase in efficiency over the 35 mm body at varying inlet/outlet delta P. This data was taken, as earlier described, where a small diameter unit was run in a parallel flow loop with a 35 mm unit. The mixture contained a mean drop size of the disperse phase in a range of 12-14 micron and the mixture temperature was 112° F. It can be readily seen from Figure A that a direct correlation exists between body size and efficiency. It is also interesting to note in FIG. 4 that one of the top lines marked 15 mm ASAD has a body similar to the lower line denoted as simply 15 mm, except that the hydrocyclone body represented by the upper line has an extended parallel section added to the body to afford a greater residence time to the fluids in the separation chamber, and consequently, has a higher efficiency.

In analyzing the vast amount of data taken in the course of these tests, a theme or rational was sought for the various phenomena described above. While an absolute explanation is perhaps not possible, a likely explanation has been set forth above relative to longer residence time, shorter distances for drops to travel, behavior of small droplets under high shear conditions, etc. However, in further analysis it appeared that a heretofore unknown relationship existed which impacts greatly on the problem at hand, that being the area to volume ratio of the separation chamber after it reaches a place in the body shape where maximum acceleration occurs. This place we believe occurs approximately at that place in the standard type configurations as set forth in FIG. 1 where $D_T$ occurs, that also being where the slope changes from a steep slope to a finer or more gentle slope whether it be a taper or the equivalent curve. In this respect, the following illustrates how this A/V ratio can be calculated for a given configuration.

$$\frac{A}{V} \text{ (ratio)} = \frac{\text{Sum of Internal Surface Area of All Components}}{\text{Sum of Internal Volumes of All Components}}$$

For components with circular cross sections:

$$\frac{A}{V} = \frac{\sum_{c=1}^{n} \left( \int_{x_c^i}^{x_c^o} 2\pi r_c(x) dx \right)}{\sum_{c=1}^{n} \left( \int_{x_c^i}^{x_c^o} \pi r_c(x)^2 dx \right)} \quad 1)$$

or similarly, $$\frac{A}{V} = \frac{\int_{x_1^i}^{x_1^o} 2\pi r_1(x) dx + \int_{x_2^i}^{x_2^o} 2\pi r_2(x) dx + \ldots + \int_{x_n^i}^{x_n^o} 2\pi r_n(x) dx}{\int_{x_1^i}^{x_1^o} \pi r_1(x)^2 dx + \int_{x_2^i}^{x_2^o} \pi r_2(x)^2 dx + \ldots + \int_{x_n^i}^{x_n^o} 2\pi r_n(x)^2 dx} \quad 2)$$

where:
X = distance along centerline of component
$r_c(x)$ = radius as a function of axial distance for component c
c = component number 1, 2, 3 ..., n
i = inlet
o = outlet The function $r_c(x)$ is completely general and takes on forms like the following, but not limited to the following:

(1) For a cylindrical component:

$$r_c(x) = k$$

where k is a constant radius.

(2) For a conical section:

$$r_c(x) = r_i \gamma(x)$$

$$\gamma(x) = x \sin \theta$$

so $r_c(x) = r_i - x \sin \theta$ where θ is the half-angle of the cone.

(3) For a quadratically curved component:

$$r_c(x) = r_i + \beta x + \alpha x^2$$

where = β and α are constants describing the curvature of the component.

In order to calculate the A/V ratio of the total body configuration in FIG. 1a you simply integrate the area and volume of each section of the body taken separately. For the purposes of this invention, it is the area to volume ratio of that portion $L_e$ of the separation chamber beginning at $L_T$ and extending to the underflow outlet, that is of interest. Thus, for the configuration shown in FIG. 1 (a and b) we would first calculate the area and volume of that portion occurring from $D_T$ to the dotted line 34. Then you would calculate the area and volume of that portion 30 extending from dotted line 34 to the outlet 16, which in this case is shown as a cylindrical component. This latter portion, of course, would have a constant radius and would not need be integrated, and the area for example, would simply be calculated, as $2\pi rx$, with x being the axial length of the component portion involved. Volume in this same cylindrical portion would be calculated as $\pi r^2 x$. This procedure is followed then until the area and volume of all portions of interest are calculated. It should be noted that this portion $L_e$ is a functional portion of the chamber and since there are many configurations of chambers that can be devised, it is well to understand this teaching in its functional terms. The beginning of the portion $L_e$ is where it is approximated that the maximum velocity and maximum acceleration of the fluid occurs. This is not an absolute place from a practical standpoint, at least as to being able to determine its precise location. If the chamber were a straight taper from beginning to end; i.e., a truncated cone; having a single angle of taper, this $D_T$ would be described as occurring at the inlet to the chamber and $L_e$ would begin ar $D_i$ near the end wall 14. As to the underflow outlet or end of $L_e$, this occurs where the separation process ends, at the outlet thereof, if one were to add a diverging section of some length to the end of the separation chamber it is likely that radial acceleration or swirl in the chamber would drop off and thus separation due to centrifugal forces would end. This would functionally be the end of the separation chamber and the end point of distance $L_e$. Where $D_T$ has been defined to occur at some certain point, it is for purposes of being definite, as for example, in claiming the invention. A more functional way to fix $D_T$ is within some range in which it will fall Another way to describe $D_T$ is at a place where the slope of the chamber wall reaches a certain value.

Figure 5:
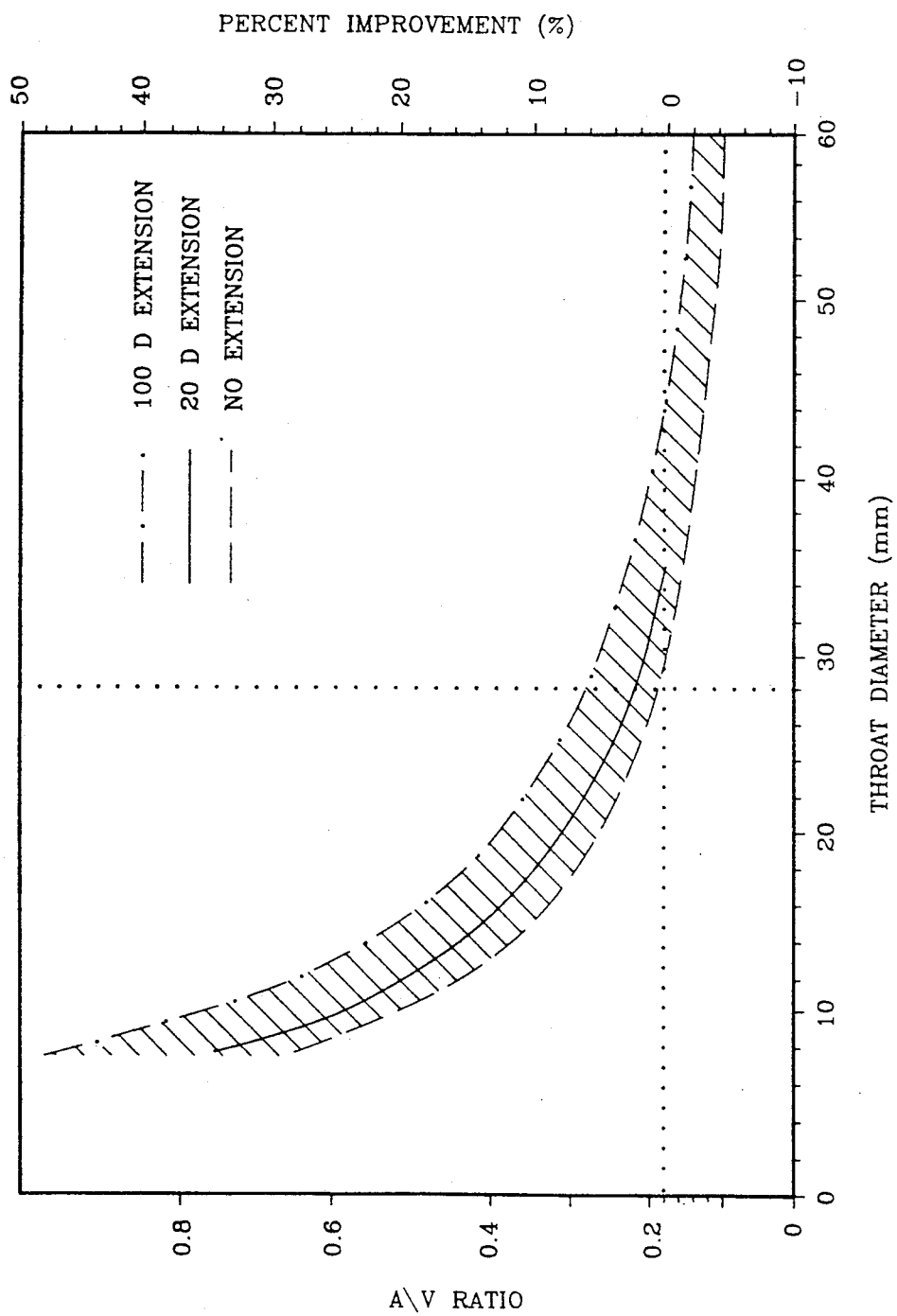
FIG. 5 is a graphical representation of nominal diameter of hydrocyclone versus area to volume ratio versus improvement in efficiency.

Reference is now made to FIG. 5 of the drawings which shows a plot of Area to Volume ratios versus throat diameters for various configurations of hydrocyclones. The percent of approximate improvement over a 35 mm hydrocyclone is shown on the right hand scale. The percent improvement will also be a function of droplet distribution, temperature, density, ph, interfacial surface tension, etc. The lower curve is for a body such as shown in of FIG. 1a with $L_e$ beginning at $D_T$ and with no parallel extension. The parallel extension is that portion of the separation chamber that is cylindrical or substantially cylindrical and extends from the dotted line 34 to the underflow outlet 16. Thus, the bottom curve of FIG. 5 is represented by a body having an $L_e$ that ends at 34 as shown in FIG. 1 (a and b). The middle curve of FIG. 5 (a solid line) represents a hydrocyclone similar to the standard geometry of FIG. 1a, having a 0.75 degree taper angle $\alpha$ for the tapered portion 26 as shown at 36. This unit also has a parallel extension portion 30 of 20 $D_T$. The upper curve of FIG. 5 represents a hydrocyclone body having a taper angle of 3° and a parallel extension of 100 $D_T$. It is seen from the data presented in FIG. 5 that the area to volume ratio for hydrocyclones having a throat diameter of 8 to 28 mm generally falls within a range of 0.19 to 0.9. However, there may be petroleum applications not presently contemplated or uses in other industries where smaller units would be practical and therefore the lower limits of data herein stated do not limit the concepts involved in this teaching to any particular minimum size.

Therefore, while particular embodiments of the present invention have been shown and described, it is apparent that changes and modifications may be made without departing from this invention in its broader aspects, and therefore, the aim in the appended claims is to cover all such changes and modifications as fall within the true spirit and scope of the invention.

What is claimed is:

1. A high efficiency hydrocyclone apparatus for separating liquid constituents from a fluid mixture wherein one of the constituents is a dispersed phase of liquid droplets within a liquid continuous phase, wherein the high efficiency hydrocyclone comprises;

a separation chamber having an inlet portion at one end of the separation chamber and an outer wall portion throughout the separation chamber;

inlet means for inletting the fluid mixture into the inlet portion of the separation chamber to generate a swirling motion of the fluid mixture, said inlet portion having an inlet diameter $D_i$ in the plane of the inlet means opening into said inlet portion;

an overflow outlet on the separation chamber for outletting a less dense component of the fluid mixture;

an underflow outlet at the other end of said separation chamber opposite the inlet portion end;

said separation chamber further comprising a first tapered or curved portion extending from said inlet portion toward said underflow outlet for accelerating the swirling motion of the fluid, and a second tapered, curved, or substantially cylindrical portion extending from said first portion and having less taper or curve than said first portion, with a transition between said first portion and said second portion being represented by a throat portion having a throat diameter $D_T$ which is located at a point in the separation chamber at or near said transition between said first portion and said second portion where an angle of taper $\alpha$ between a longitudinal axis of the separating chamber and the outer wall portion is equal to 2°, where $$\text{tangent}\alpha = \frac{\Delta r}{L}$$

and where $\Delta r$ is the difference in radius of the separation chamber over an axial length $L$ of the separation chamber;

said separation chamber having an elongated portion beginning at $D_T$ and extending therefrom which includes any additional tapered, curved or substantially cylindrical portion which make up the elongated portion of said separation chamber up to the underflow outlet therefrom, the elongated portion being described herein as having an effective length $L_e$ and being effective to prolong the residence time of the swirling motion of the fluid mixture in the separation chamber;

said separation chamber having a throat diameter $D_T$ which is equal to or less than 28 mm and the distance $L_T$ (between the inlet diameter $D_i$ and the throat portion having a diameter $D_T$) is less than 6.7 $D_i$ for more rapidly accelerating the swirling motion of the fluid mixture in a relatively short first portion; and where the effective length of the elongated portion $L_e$ is greater than 27.2 $D_T$ to provide an extended residence time for the swirling motion of fluids in the separation chamber to thereby provide greater residence time for migration of small droplets of the less dense component to be effectively removed through the overflow outlet.

2. The hydrocyclone apparatus of claim 1 and further wherein $L_T$ is less than 2.4 $D_i$.

3. The hydrocyclone apparatus of claim 2 wherein $L_e$ is greater than 49 $D_T$.

4. The hydrocyclone apparatus of claim 2 wherein $D_i$ is equal to or less than 40 mm.

5. The hydrocyclone apparatus of claim 1 wherein $L_e$ is greater than 37.5.

6. The hydrocyclone apparatus of claim 1 wherein $L_e$ is greater than 37.5 $D_T$ and $L_T$ is less than 3.9 $D_i$.

7. The hydrocyclone apparatus of claim 1 wherein $D_i$ is equal to or less than 70 mm.

8. The hydrocyclone apparatus of claim 1 wherein $D_T$ is less than or equal to 20 mm.

9. The hydrocyclone apparatus of claim 8 wherein $L_e$ is greater than 39 $D_T$ and $L_T$ is less than 2.4 $D_i$.

10. The hydrocyclone apparatus of claim 9 wherein $D_i$ is equal to or less than 40 mm.

11. The hydrocyclone apparatus of claim 1 wherein $D_T$ is from 8 to 20 mm.

12. The hydrocyclone apparatus of claim 1 wherein $L_e$ is from 39 to 100 $D_T$.

13. The hydrocyclone apparatus of claim 1 wherein $D_T$ is equal to 0.6 $D_i$ and $L_T$ is less than 2.18 $D_i$.

14. A high efficiency hydrocyclone apparatus for separating liquid constituents from a fluid mixture wherein one of the constituents is a dispersed phase of liquid droplets within a liquid continuous phase, comprising:
   a separation chamber having an inlet portion at one end of the separation chamber;
   inlet means for inletting a fluid mixture into the inlet portion of the separation chamber;
   said inlet portion having an inlet diameter $D_i$ in the plane of the inlet means opening into said inlet portion;
   an overflow outlet on the separation chamber for outletting a less dense component of the fluid mixture;
   an underflow outlet at the end of the separation chamber opposite the inlet means for outletting a more dense component of the fluid mixture;
   said separation chamber further including a first tapered or curved portion extending from the inlet portion toward said opposite end, and a second tapered, curved, or substantially cylindrical portion extending from said first portion toward said opposite end and having less taper or curve than said first portion, with a transition between said first portion and said second portion being represented by a throat portion occurring at or near the transition between said first and second portions and having a diameter $D_T$ which is less than or equal to 28 mm.;
   wherein an elongated portion beginning at $D_T$ and extending therefrom includes an additional tapered, curved or substantially cylindrical portion which together with said second portion makes up the elongated portion of said separation chamber up to the underflow outlet therefrom, the elongated portion being described herein as having an effective length $L_e$;
   where the throat diameter $D_T$ is located at a point that is equal to 0.5 $D_i$;
   where the distance $L_T$ measured between the inlet portion end of the hydrocyclone and the throat portion having a diameter $D_T$ is less than 6.7 $D_i$ for more rapidly accelerating the swirling motion of the fluid mixture in a relatively short first portion; and
   where $L_e$ is greater than 27.2 $D_T$ to provide an extended residence time for swirling motion of fluids to thereby provide greater residence time for migration of small droplets of the less dense component to be effectively removed through the overflow outlet.

15. The hydrocyclone apparatus of claim 14 wherein $D_T$ is less than or equal to 20 mm.

16. The hydrocyclone apparatus of claim 14 wherein $L_T$ is less than 3.9 $D_i$ and $L_e$ is greater than 37.5 $D_T$.

17. The hydrocyclone apparatus of claim 14 wherein $D_T$ is from 8 to 28 mm.

18. The hydrocyclone apparatus of claim 14 wherein $L_e$ is greater than 49.

19. The hydrocyclone apparatus of claim 18 wherein $L_T$ is less than 2.4 $D_i$.

20. The hydrocyclone apparatus of claim 14 wherein the overflow outlet for outletting a less dense constituent is axially positioned in an end wall of the inlet portion.

21. The hydrocyclone apparatus of claim 20 wherein $L_T$ is less than 2.41 $D_i$.

22. The hydrocyclone apparatus of claim 21 wherein $L_e$ is greater than 39 $D_T$.

* * * * *

UNITED STATES PATENT AND TRADEMARK OFFICE
CERTIFICATE OF CORRECTION

PATENT NO. : 5,071,557
DATED : December 10, 1991
INVENTOR(S) : Mark F. Schubert, Reimer Z. Hansen It is certified that error appears in the above-identified patent and that said Letters Patent is hereby corrected as shown below:

Column 12, line 37, 38, 39, 40 and 41 that portion of the formula reading.

$r_c(x) = r_i \gamma(x)$ should read $r_c(x) = r_i - \delta(x)$ $\gamma(x) = x \sin \theta$ $\delta(x) = x \tan \theta$ so $r_c(x) = r_i - x \sin \theta$ so $r_c(x) = r_i - x \tan \theta$ Signed and Sealed this Thirtieth Day of March, 1993

Attest:

STEPHEN G. KUNIN

Attesting Officer     Acting Commissioner of Patents and Trademarks